United States Patent
Jankovic et al.

(10) Patent No.: US 9,103,293 B2
(45) Date of Patent: Aug. 11, 2015

(54) METHOD FOR REDUCING SENSITIVITY FOR ENGINE SCAVENGING

(75) Inventors: Mrdjan J. Jankovic, Birmingham, MI (US); Amey Y. Karnik, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 447 days.

(21) Appl. No.: 13/327,668

(22) Filed: Dec. 15, 2011

(65) Prior Publication Data

US 2013/0152584 A1   Jun. 20, 2013

(51) Int. Cl.
*F02B 37/12*       (2006.01)
*F02D 41/14*       (2006.01)
*F02D 41/18*       (2006.01)
*F02P 5/15*        (2006.01)
*F02D 37/02*       (2006.01)
*F02D 41/00*       (2006.01)

(52) U.S. Cl.
CPC .......... *F02D 41/1456* (2013.01); *F02D 37/02* (2013.01); *F02D 41/0002* (2013.01); *F02D 41/18* (2013.01); *F02P 5/1502* (2013.01); *F02D 41/0007* (2013.01); *F02D 2041/001* (2013.01); *Y02T 10/42* (2013.01); *Y02T 10/46* (2013.01)

(58) Field of Classification Search
CPC .................................. F02B 37/12; F02D 9/08
USPC ......... 60/605.2, 612, 286; 123/90.15, 568.13, 123/568.12
See application file for complete search history.

(56) References Cited

U.S. PATENT DOCUMENTS

| 5,555,859 | A | * | 9/1996 | Melchior et al. ............ 123/79 C |
| 7,021,298 | B2 |   | 4/2006 | Nakazawa et al. |
| 7,275,516 | B1 |   | 10/2007 | Cunningham et al. |
| 7,870,843 | B2 | * | 1/2011 | Wiggins et al. ............... 123/321 |
| 2007/0044472 | A1 |   | 3/2007 | Zhang |
| 2009/0070014 | A1 |   | 3/2009 | Miyashita |
| 2009/0228187 | A1 | * | 9/2009 | Nakamura .................... 701/103 |
| 2010/0186384 | A1 | * | 7/2010 | Gonze et al. .................... 60/286 |
| 2010/0312451 | A1 |   | 12/2010 | Karnik et al. |
| 2011/0017178 | A1 | * | 1/2011 | McDonald et al. ........... 123/520 |
| 2011/0041786 | A1 | * | 2/2011 | Goto et al. ................. 123/90.15 |
| 2012/0111302 | A1 | * | 5/2012 | Shishime et al. ............. 123/299 |
| 2012/0222400 | A1 | * | 9/2012 | Walker et al. ................... 60/274 |

FOREIGN PATENT DOCUMENTS

WO    WO 2010103401 A1 *   9/2010

OTHER PUBLICATIONS

Hagner, Dave G. et al., "Method for Determining and Compensating Engine Blow-Through Air," U.S. Appl. No. 13/293,015, filed Nov. 9, 2011, 25 pages.

* cited by examiner

*Primary Examiner* — Kenneth Bomberg
*Assistant Examiner* — Shafiq Mian
(74) *Attorney, Agent, or Firm* — Julia Voutyras; Alleman Hall McCoy Russell & Tuttle LLP

(57) ABSTRACT

A method for correcting a total cylinder air flow during scavenging by way of an oxygen sensor is disclosed. Additionally, cylinder trapped air amount and cylinder scavenging air amount are adjusted based on the corrected total cylinder air flow. The approach may reduce sensitivity between cylinder air flow estimates and fuel supplied for combustion.

19 Claims, 5 Drawing Sheets

METHOD FOR REDUCING SENSITIVITY FOR ENGINE SCAVENGING

BACKGROUND/SUMMARY

Performance of an engine can be enhanced via a turbocharger or a supercharger. The turbocharger or supercharger pressurizes ambient air to increase the density of air entering engine cylinders. The cylinder trapped air amount is increased as the cylinder charge may be denser than that of a non-turbocharged engine. This may allow increased amount of fuel injected to be into the engine cylinder compared to a non-turbocharged engine, hence result in increased torque.

Further performance gains and emissions reduction may be provided for a turbocharged engine via variable intake and/or exhaust valve timing. In particular, intake and exhaust valves of a turbocharged engine may be adjusted to reduce NOx formation, increase engine power, and reduce engine pumping losses. In some examples, intake and exhaust valves of a cylinder may be open at the same time to provide internal (e.g., within a cylinder) exhaust gas recirculation (EGR) or to help evacuate exhaust from a cylinder and increase engine output.

For example, internal EGR may be provided in an engine cylinder when intake and exhaust valves are simultaneously open and when engine intake manifold pressure is lower than engine exhaust manifold pressure. On the other hand, engine output power may be increased when intake and exhaust valves of a cylinder are simultaneously open and when engine intake manifold pressure is higher than engine exhaust manifold pressure. Pressurized air in the engine intake manifold can drive exhaust gases from the cylinder to the engine exhaust manifold so that cylinder fresh charge (e.g. air and fuel) may be increased. However, if engine control parameters (e.g., spark timing) are adjusted based on an uncorrected air amount or a bulk air amount that passes through a cylinder, the engine control parameters may be adjusted in an undesirable way. Further, the output of modeled systems (e.g., exhaust systems) that rely on cylinder trapped air amount may not track actual system conditions as close as is desired because of errors that may result from the uncorrected cylinder trapped air amount or the bulk air amount.

The inventors herein have recognized the above-mentioned disadvantages and have developed a method for operating an engine, comprising: adjusting a first actuator in response to an cylinder scavenging air amount, the cylinder scavenging air amount corrected via an oxygen sensor; and adjusting a second actuator in response to a cylinder trapped air amount, the cylinder trapped air amount corrected via the oxygen sensor apart from the cylinder scavenging air amount.

By correcting both cylinder trapped air amount and cylinder scavenging air amount via an oxygen sensor, it may be possible to improve control adjustments that are related to total cylinder air flow. Additionally, conditions that may affect cylinder trapped air amount but may not be sensed via a mass air sensor or MAP sensor may be compensated when cylinder trapped air amount and cylinder scavenging are adjusted via an oxygen sensor. For example, rather than adjusting spark timing based on a total or bulk air mass passing through a cylinder during a cylinder cycle, spark timing may be adjusted based on a corrected cylinder trapped air amount that reflects the amount of air participating in combustion. Further, intake and exhaust valve opening overlap of a cylinder may be adjusted in response to a corrected cylinder scavenging air amount. In this way, fractions or portions of an air amount flowing through a cylinder during a cylinder cycle that participate in combustion during a cylinder cycle can be corrected and compensated for separately. In addition, correcting cylinder trapped air amount and cylinder scavenging air amount via an oxygen sensor can remove sensitivities to changes in exhaust system manifold pressure and valve timing that may exist when cylinder trapped air amount and cylinder scavenging air amount are determined solely using a mass air flow sensor or a MAP sensor.

The present description may provide several advantages. In particular, the approach may reduce vehicle emissions by correcting cylinder trapped air amount and cylinder scavenging air amounts. Further, an engine actuator such as a camshaft phase actuator may be adjusted so as to control the amount of scavenging supplied to the exhaust gas after treatment device so that scavenging may closed-loop controlled. Additionally, the method provides for adjusting exhaust manifold pressure estimates so that exhaust gas residuals in a cylinder may be more accurately determined.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
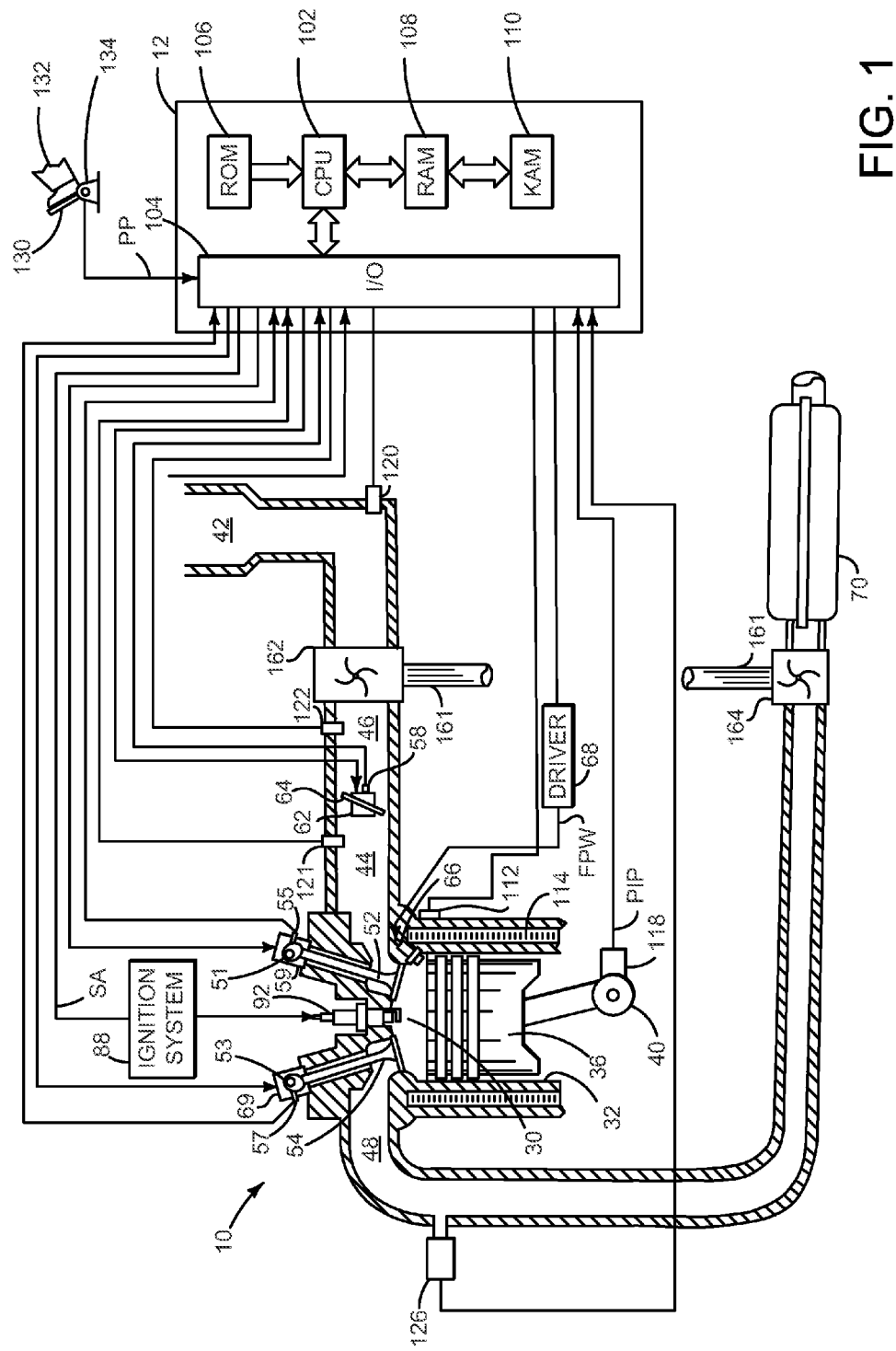
FIG. 1 shows a schematic depiction of an engine.
Figure 2:
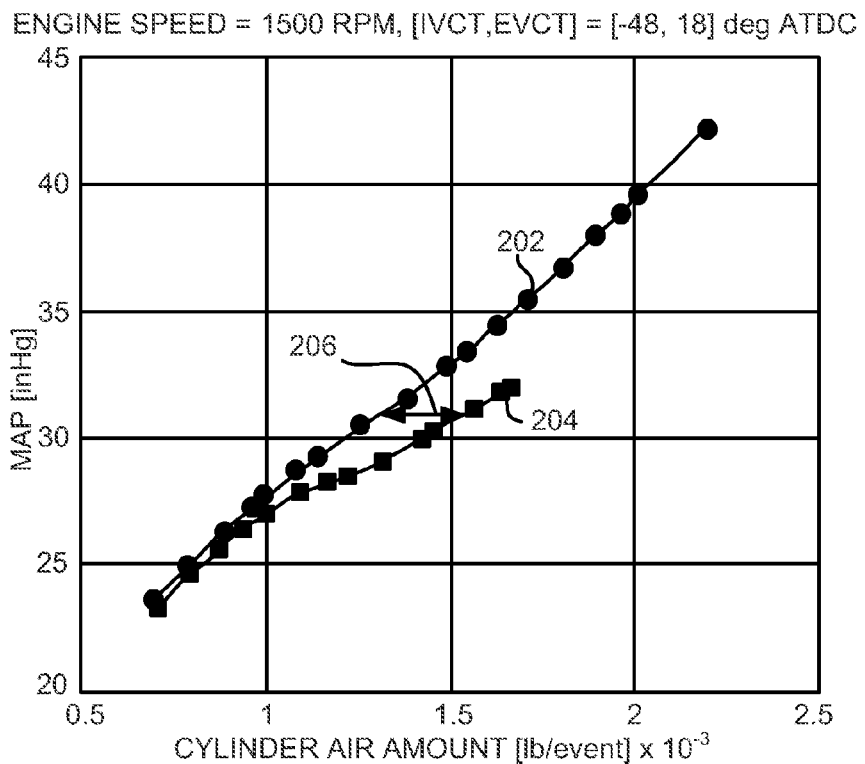
FIG. 2 shows a simulated intake MAP versus cylinder trapped air amount relationship for an engine operating at a constant speed.
Figure 3:
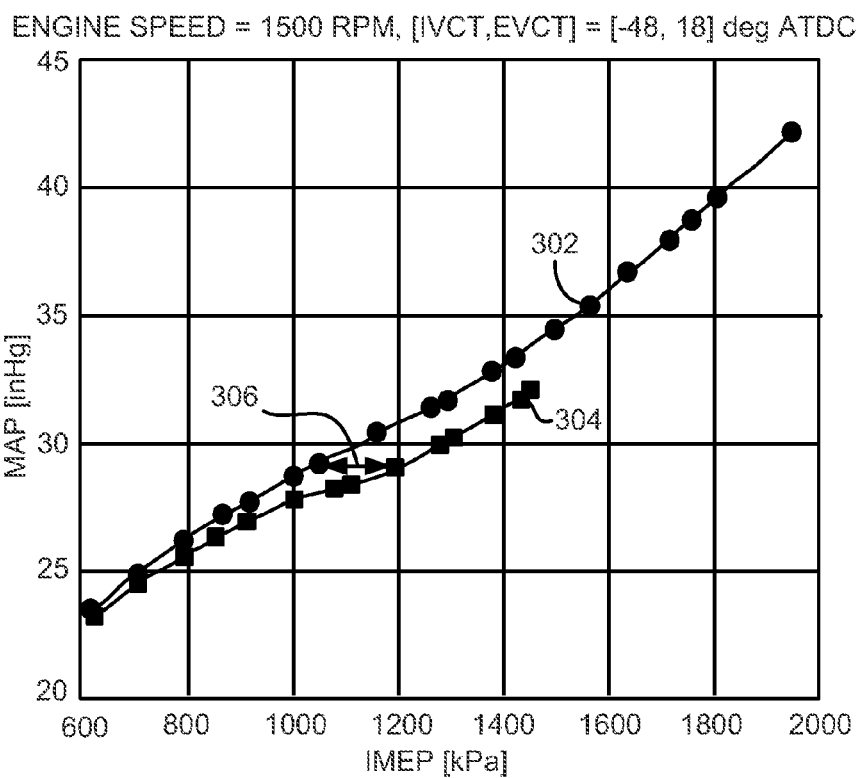
FIG. 3 shows a simulated intake MAP versus indicated mean effective pressure (IMEP) relationship for an engine operating at a constant speed.
Figure 4:
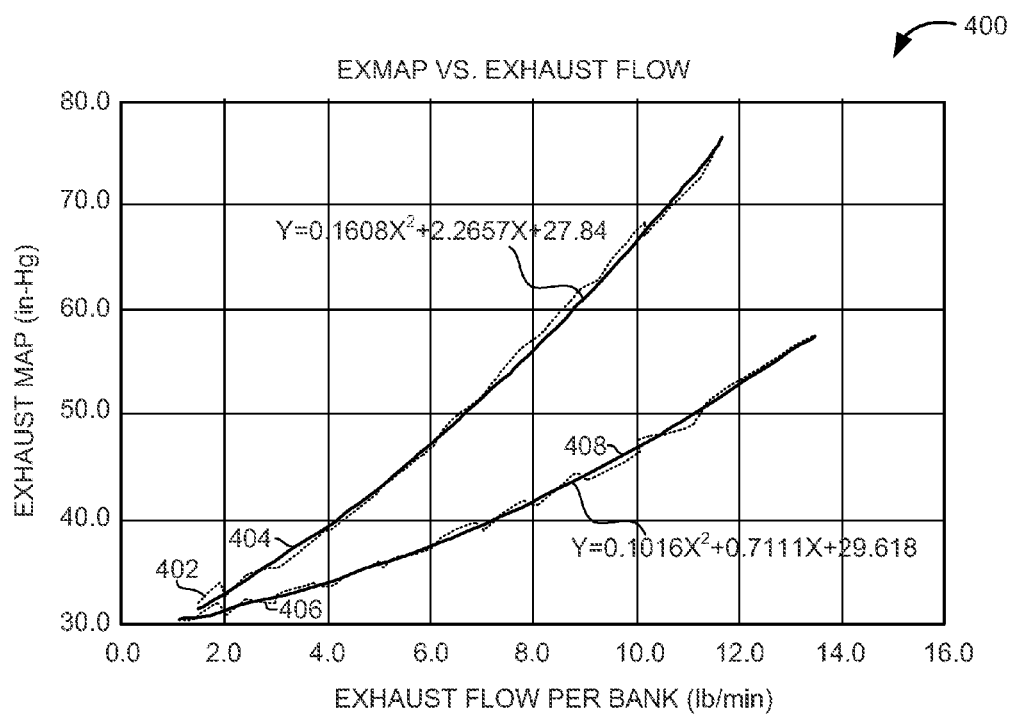
FIG. 4 shows a simulated exhaust MAP versus exhaust flow relationship.
Figure 5:
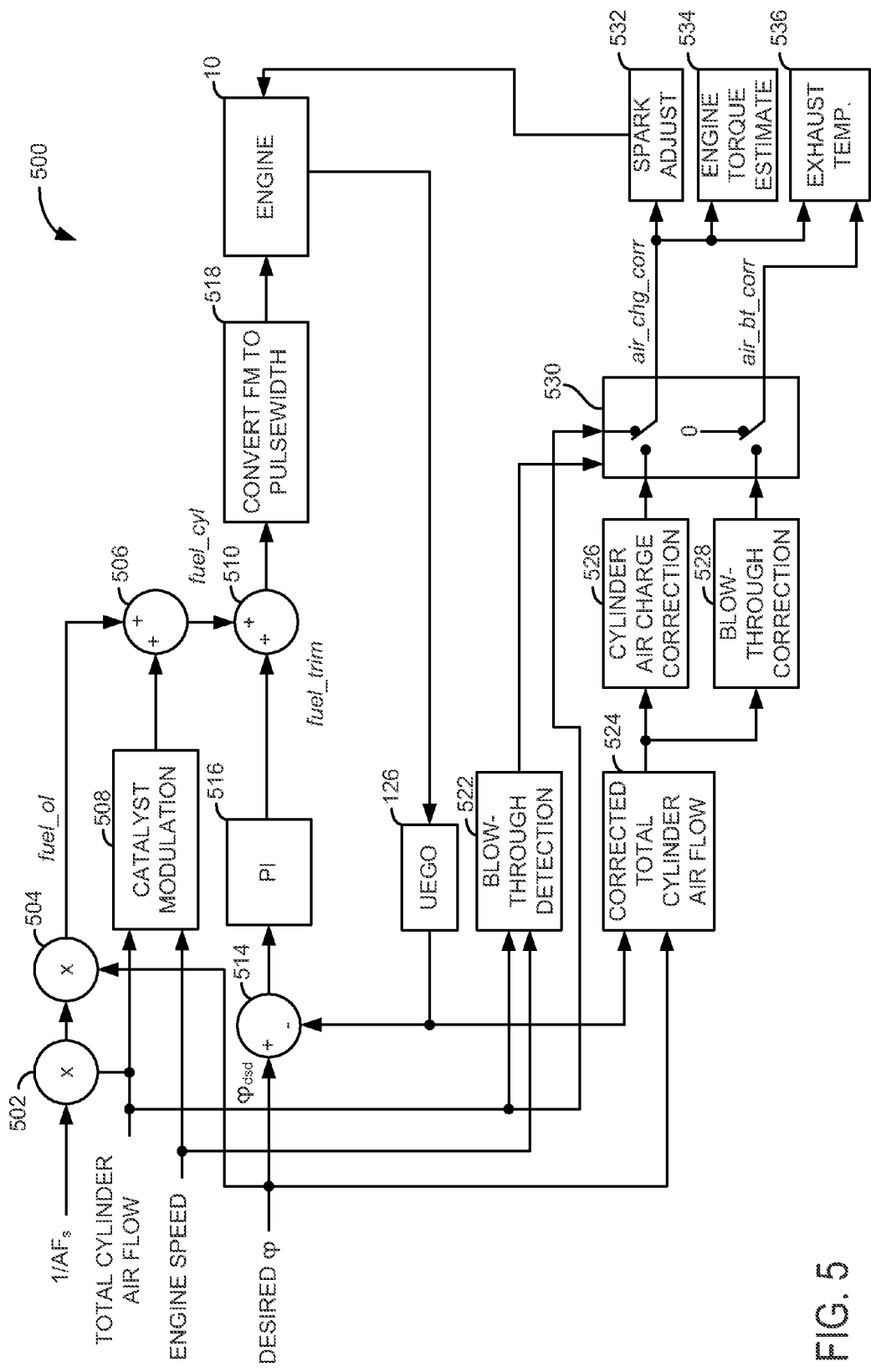
FIG. 5 shows a control block diagram for correcting cylinder trapped air amount and cylinder scavenging with an oxygen sensor.
Figure 6:
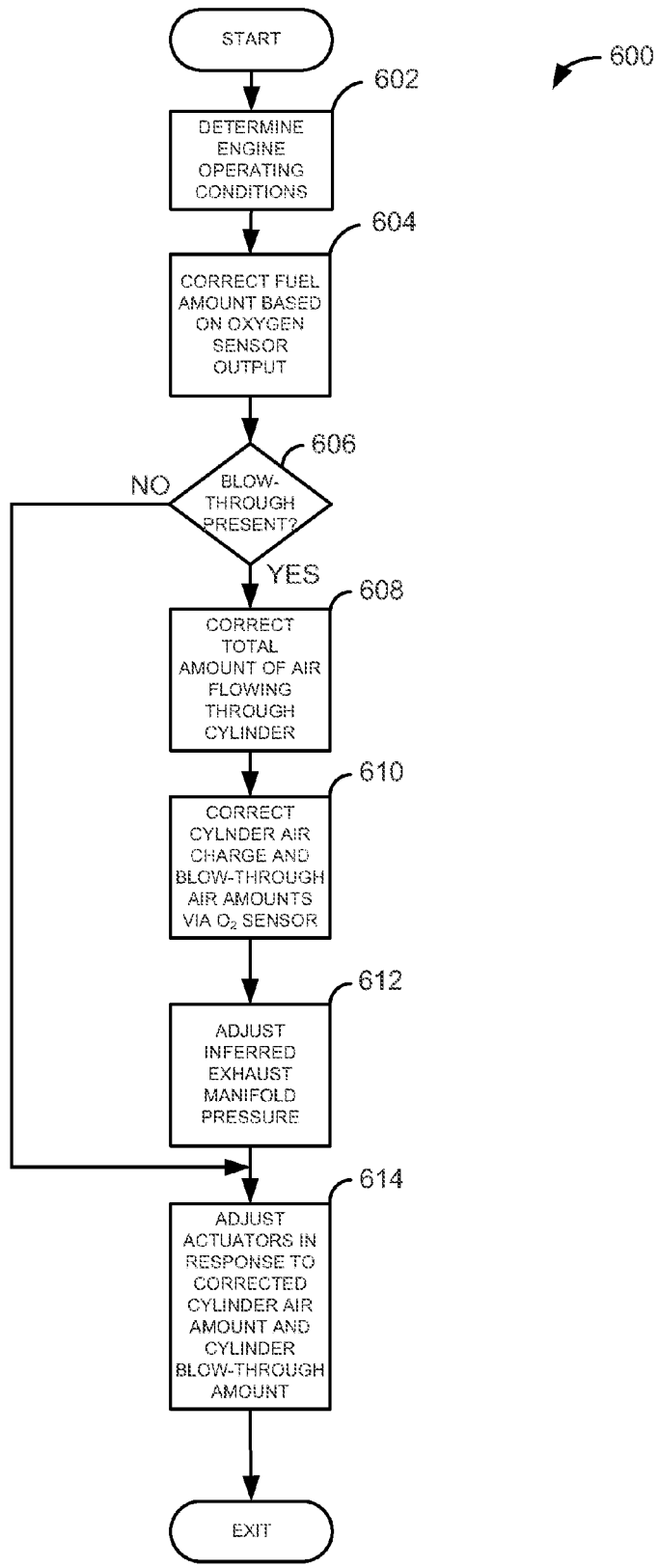
FIG. 6 shows high level flowchart of a method for correcting cylinder trapped air amount and cylinder scavenging with an oxygen sensor.

The present description is directed to correcting cylinder trapped air amount and cylinder scavenging of a cylinder of an engine. The corrected cylinder trapped air amount and cylinder scavenging air amount may be used to adjust states of engine actuators. FIG. 1 shows one example system for determining and correcting cylinder trapped air amount and cylinder scavenging air amount. The system includes a turbocharger operated with a spark ignited mixture of air and gasoline, alcohol, or a mixture of gasoline and alcohol. However, in other examples the engine may be a compression ignition engine, such as a diesel engine. FIGS. 2 and 3 show how a change in engine backpressure can affect a MAP versus cylinder trapped air amount/IMEP relationship. FIG. 4 shows how a position of a turbocharger waste gate or vane can affect engine back pressure. FIG. 5 shows a block diagram for correcting cylinder trapped air amount and cylinder scavenging. FIG. 6 shows an example method for correcting cylinder trapped air amount and cylinder scavenging air amount.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The phase of intake cam 51 and exhaust cam 53 may be adjusted via cam phase actuators 59 and 69. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from intake boost chamber 46.

Exhaust gases spin turbocharger turbine 164 which is coupled to turbocharger compressor 162 via shaft 161. Compressor 162 draws air from air intake 42 to supply boost chamber 46. Thus, air pressure in intake manifold 44 may be elevated to a pressure greater than atmospheric pressure. Consequently, engine 10 may output more power than a normally aspirated engine.

Distributorless ignition system 88 provides an ignition spark to combustion chamber 30 via spark plug 92 in response to controller 12. Ignition system 88 may provide a single or multiple sparks to each cylinder during each cylinder cycle. Further, the timing of spark provided via ignition system 88 may be advanced or retarded relative to crankshaft timing in response to engine operating conditions.

Universal Exhaust Gas Oxygen (UEGO) sensor 126 is shown coupled to exhaust manifold 48 upstream of exhaust gas after treatment device 70. Alternatively, a two-state exhaust gas oxygen sensor may be substituted for UEGO sensor 126. In some examples, exhaust gas after treatment device 70 is a particulate filter and/or a three-way catalyst. In other examples, exhaust gas after treatment device 70 is solely a three-way catalyst.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a knock sensor for determining ignition of end gases (not shown); a measurement of engine manifold pressure (MAP) from pressure sensor 121 coupled to intake manifold 44; a measurement of boost pressure from pressure sensor 122 coupled to boost chamber 46; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples.

Thus, the system of FIG. 1 provides for a engine operating system, comprising: an engine; an actuator in communication with the engine; a turbocharger coupled to the engine; an exhaust system coupled to the turbocharger, the exhaust system including an oxygen sensor; a controller including instructions for adjusting a total cylinder air amount in response to an output of the oxygen sensor, the controller including additional instructions for providing a corrected cylinder trapped air amount and a corrected cylinder scavenging air amount based on the total cylinder air amount. The engine operating system further comprises additional instructions for adjusting spark timing of a cylinder in response to the corrected cylinder trapped air amount.

In some examples, the engine operating system further comprises additional instructions for adjusting valve timing in response to the corrected cylinder scavenging air amount. The engine operating system further comprises including additional instructions to provide an equivalence ratio correction amount based on the output of the oxygen sensor. The engine operating system further comprises including additional instructions to adjust an estimated exhaust flow. The engine operating system includes where the engine includes two cylinder banks, where the total cylinder air amount applies to a cylinder of a first cylinder bank, where the controller includes additional instructions for adjusting a total cylinder air amount of a cylinder of a second cylinder bank, and where the controller includes additional instructions for providing a corrected cylinder trapped air amount and a corrected cylinder scavenging air amount based on the corrected total cylinder air amount of the cylinder of the second cylinder bank.

Referring now to FIG. 2, an intake MAP versus cylinder air amount relationship for an engine operating at a constant speed is shown. The X axis represents cylinder air amount and cylinder air amount increases from the left side of the plot to the right side of the plot. The Y axis represents intake MAP and MAP increases from the X axis in the direction of the Y axis arrow. Cylinder air amount represents a total amount of air passing through a cylinder during a cycle of the cylinder. Consequently, when the engine is operating without scavenging air, the cylinder trapped air amount equals the total cylinder air. Thus, the total cylinder air amount participates in combustion within the cylinder. The total cylinder air amount during scavenging conditions includes a cylinder trapped air amount that participates in combustion and a cylinder scavenging air amount that does not participate in combustion within the cylinder.

Curve 202 represents intake MAP versus total cylinder air amount when a turbocharger waste gate is in a first position. It can be seen that total cylinder air amount increases with increasing MAP. In the first position, the waste gate position is fully closed.

Curve 204 represents intake MAP versus total cylinder air amount when a turbocharger waste gate is in a second position. Curve 204 initially follows the same trajectory of curve 202, but after cylinder air amount begins to increase, cylinder air amount of curve 204 increases at a higher rate for an equivalent MAP increase as compared to curve 202. In the second position, the waste gate position is fully opened. Arrow 206 shows one region of the MAP versus cylinder air amount plot where there is a 16% of mean difference in total amount of air passing through the cylinder between curve 202 and curve 204. Thus, a 16% error in engine air-fuel ratio may result if the total cylinder air amount is not corrected when the engine is operating at the MAP level of arrow 206.

Thus, from curves 202 and 204, it can be seen that exhaust manifold pressure can affect an estimate of cylinder air amount that is based on MAP. Further, exhaust manifold pressure can affect an estimate of MAP that is based on cylinder air amount as determined via a mass air flow sensor in an engine intake system. Therefore, it may be desirable to correct air flowing through a cylinder for engine exhaust manifold pressure. However, the inaccuracies in cylinder trapped air amount that are related to exhaust backpressure may not be apparent by simply monitoring MAP or mass air flow (MAF). On the other hand, an exhaust gas oxygen sensor can detect the presence or absence of excess oxygen in engine exhaust gases. And, the presence or absence of excess oxygen in engine exhaust gases may be indicative of a change in engine backpressure that results in an increase or a decrease of engine scavenging. Thus, an output of an oxygen sensor may be a basis for correcting an amount of air passing through a cylinder.

Referring now to FIG. 3, an IMEP versus cylinder trapped air amount relationship for an engine operating at a constant speed is shown. The X axis represents cylinder IMEP and cylinder IMEP increases from the left side of the plot to the right side of the plot. The Y axis represents intake MAP and MAP increases from the X axis in the direction of the Y axis arrow. IMEP may be correlated to the amount of air in a cylinder that participates in combustion within a cylinder. The relationship between cylinder trapped air and IMEP is near linear and may be expressed in an equation as a slope and an offset.

Curve 302 represents intake MAP versus cylinder IMEP when a turbocharger waste gate is in a first position. It can be seen that cylinder IMEP increases with increasing MAP; however, IMEP does not continue to increase when scavenging is present. In the first position, the waste gate position is fully closed.

Curve 304 represents intake MAP versus cylinder IMEP when a turbocharger waste gate is in a second position. Curve 304 initially follows the same trajectory of curve 302, but in curve 304, cylinder IMEP increases at a higher rate for an equivalent MAP increase as compared to curve 302. In the second position, the waste gate position is fully opened.

Arrow 306 shows one region of the MAP versus cylinder IMEP plot where there is a 12% of mean difference in cylinder IMEP between curves 302 and curve 304. Thus, a 12% error in engine torque estimate may be provided if the cylinder trapped air amount is not corrected when the engine is operating at the MAP level of arrow 306.

Thus, curves 302 and 304, confirm that an amount of air that participates in combustion in a cylinder (e.g., cylinder trapped air amount) may be affected by change in engine exhaust manifold absolute pressure (exhaust MAP). Therefore, it may be desirable to correct cylinder trapped air amount as determined from a MAP or MAF sensor.

Referring now to FIG. 4, a plot of exhaust MAP versus exhaust flow, which equals the sum of total cylinder airflow and fuel injected, is shown. It may be desirable to accurately model exhaust MAP so that burned gas dilution (e.g., EGR) within a cylinder may be accurately determined. Further, in some examples, an accurate estimate of dilution may be desirable to control the position of a turbocharger waste gate so that a desired engine air flow may be provided to the engine while engine exhaust pressure is controlled to less than a threshold amount. In this way, engine efficiency may be maintained.

Curve 402 represents data of exhaust MAP versus exhaust flow. Curve 404 represents a curve regressed from the data of curve 402. Thus, the data of curve 402 may be represented by curve 404 so that the exhaust MAP versus exhaust flow may be represented in a simplified form. Curves 402 and 404 represent exhaust MAP versus exhaust flow when a turbocharger waste gate is fully closed.

Curve 406 represents data of exhaust MAP versus exhaust flow. Curve 408 represents a curve regressed from the data of curve 406. Thus, the data of curve 406 may be represented by curve 408 so that the exhaust MAP versus exhaust flow may be represented in a simplified form. Curves 406 and 408 represent exhaust MAP versus exhaust flow when a turbocharger waste gate is fully opened.

Thus, it can be seen from FIG. 4 that exhaust back pressure may be significantly increased during some engine operating conditions. In some examples, curves 404 and 408 may be boundaries for determining limits to exhaust pressure adaptation.

Referring now to FIG. 5, a control block diagram for correcting cylinder trapped air amount and cylinder scavenging air amount via an oxygen sensor is shown. Instructions to correct cylinder trapped air amount and cylinder scavenging air according to the block diagram of FIG. 5 may be executed by controller 12 in the system shown in FIG. 1.

At 502, the controller shown in block diagram 500 multiplies total cylinder air flow (e.g., the total amount of air flowing through a cylinder during a cycle of the cylinder) by one over a stoichiometric air-fuel ratio (e.g., 14.64 for gasoline) of the fuel being combusted by the engine.

At 504, the output of 502 is multiplied by desired equivalence ratio φ to provide an open-loop fuel amount fuel_ol. Equivalence ratio is defined as the mixture's fuel to air ratio (by mass) divided by the fuel to air ratio for a stoichiometric mixture. A stoichiometric mixture has an equivalence ratio of 1.0; lean mixtures have a value of less than 1.0; and, rich mixtures are value greater than 1.0.

At 508, total cylinder air flow and engine speed are used to index tables that output empirically determined fuel modulation values for improving catalyst efficiency. For example, if an engine is operating at 1500 RPM with a cylinder air flow of $2.0 \times 10^{-3}$ lb-mass it may be determined that it is desirable to oscillate air-fuel ratio of a cylinder by 0.3 air-fuel ratio (about 2%) at a frequency of 0.5 Hz. The output of 508 provides fuel adjustments to oscillate engine air-fuel ratio at the given total cylinder air amount. The output of 508 is added to the output of 504 at 506.

The closed-loop portion of controller block diagram 500 includes summing junction 514 where actual φ as measure by UEGO sensor 126 is subtracted from desired φ to provide a term $\phi_{trim}$. Desired φ may be empirically determined and stored in memory that may be indexed using engine speed and load. The closed-loop portion of controller 500 is also shown with proportional and integral adjustments at block 516 that are based $\phi_{trim}$.

The proportional and integral adjustments from block 516, fuel_trim, and the sum of the open-loop fuel amount fuel_ol from 504 and the catalyst modulation fuel from 508 are added together at 510 to determine an amount of fuel to be provided to an engine cylinder based on a total cylinder air flowing through a cylinder during a cylinder cycle.

At 518, the amount of fuel to be provided to an engine cylinder is converted to a fuel injector pulse width for driving a fuel injector. In one example, a fuel injector transfer function that relates fuel amount to fuel pulse width is stored in memory and indexed by fuel amount. The transfer function is indexed by fuel amount and the fuel pulse width is delivered to a fuel injector supplying fuel to a cylinder of the engine 10. The engine expels combustion byproducts which are sampled by UEGO 126 to determine whether or not a desired amount of fuel is matched to the total amount of air determined to be flowing through a cylinder. Note that the total amount of air flowing through the cylinder may be determined via a MAP sensor or a MAF sensor.

At 522, controller 500 judges whether or not the engine is operating at a condition for scavenging. In one example, selected engine operating conditions are logically combined to determine if scavenging is present. As an example, scavenging may be determined via the logic:

if ((RPM>1000) AND (RPM<2500)) AND
       (MAP>0.9·BP) AND (overlap>30)
       blow_through_region=TRUE;

else blow_through_region=FALSE;

where RPM is engine speed, BP is barometric pressure, overlap is a number of crankshaft degrees where intake and exhaust valves of a cylinder are simultaneously open, and blow_through_region is a logical variable that reflects scavenging is present when asserted. The scavenging logical variable selects whether cylinder trapped air amount and cylinder scavenging air amount are corrected and output at 530.

At 524, the total cylinder air flow is corrected based on output of an oxygen sensor. In one example, the cylinder air flow is corrected via the equations below:

$$\text{air\_phi\_ratio} = \frac{\phi_{trim}}{\phi_{dsd}} - \min\left\{\max\left\{\frac{\phi_{trim}}{\phi_{dsd}}, -q\right\}, q\right\}$$

$$\text{air\_phi\_corr\_tmp} =$$
$$\min\{\max\{\text{air\_phi\_ratio, phi\_ratio\_max}\}, \text{phi\_ratio\_min}\}$$

$$\text{air\_phi\_corr} = rolav(\text{tc\_corr, air\_phi\_corr\_tmp})$$

$$\text{air\_tot\_corr} = \text{air\_chg\_tot} * (1 + \text{air\_phi\_corr})$$

where q is a calibratable value fuel-air ratio adjustment boundary limit (e.g., 0.03 or 3%), where air_phi_ratio is a bounded φ adjustment ratio, where $\phi_{dsd}$ is the desired fuel-air ratio, $$\phi_{dsd} = \begin{cases} 1 & \text{stoich exhaust} \\ \text{air\_chg/air\_chg\_tot} & \text{stoich in-cylinder, lean exhaust,} \end{cases}$$

and where $\phi_{trim}$ is the closed loop fuel-air ratio trim (the ratio of fuel_trim signal, the output of 516, and total cylinder air charge), where air_phi_ratio_max is a maximum φ ratio correction, where air_phi_ratio_min is a minimum φ ratio correction, where air_phi_cor_tmp is a temporary variable for correcting total cylinder air flow, where rolav is a first order low pass filter having a time constant tc_corr, where air_phi_corr is the amount to correct total cylinder air flow, where air_chg_tot is a total amount of air flowing through a cylinder during a cylinder cycle, and where air_tot_corr is the corrected total cylinder air flow. The total corrected cylinder air flow is directed to 530, 526 and 528.

At 526, the cylinder trapped air amount correction is determined. In one example, the cylinder trapped air amount correction is determined according to the following equation:

air_chg_corr=min{air_tot_corr, air_$c$·
       $(1-r\_pb)$·MAP} where air_c is volumetric efficiency for full cylinder volume at the bottom dead center of the intake stroke, r_pb is a push-back ratio that account for exhaust entering the engine intake manifold from the cylinder.

At 528, the cylinder scavenging air amount correction is determined. In one example, the cylinder scavenging air amount correction is determined according to the following equation:

air_bt_corr=max{0, air_tot_corr−air_$c$·
       $(1-r\_pb)$·MAP} or air_bt_corr=air_tot_corr−air_chg_corr

The corrected cylinder trapped air amount and the corrected cylinder scavenging air amount are supplied to block 530 where corrected cylinder trapped air amount and corrected cylinder scavenging air amount are selectively output based on the state of variable blow_through_region. In particular, if the variable blow_through_region is asserted, then both corrected cylinder trapped air amount air_chg_corr and corrected cylinder scavenging air amount air_bt_corr are output for adjusting cylinder spark advance, engine torque amount, and exhaust temperature. If the variable blow_through_region is not asserted, then (un-corrected) cylinder trapped air amount air_chg is output and corrected cylinder scavenging air amount air_bt_corr is set to zero.

At 532, cylinder spark timing is adjusted in response to the corrected cylinder trapped air amount. In one example, the cylinder spark timing is empirically determined and stored in memory that is indexed via engine speed and cylinder trapped air amount. The table outputs the desired spark timing and the spark is delivered to the engine via an ignition coil.

The corrected cylinder trapped air amount may also be the basis for determining engine torque at 534. In one example, engine torque may be empirically determined and stored in a table or function that is indexed via engine speed, spark timing, and cylinder trapped air amount. The table outputs the engine torque based on empirical values stored in the table. In some examples, the tables may further include engine torque values that are adjusted according to valve timing. In other examples, engine torque may be determined according to the method described in U.S. Pat. No. 7,072,758 which is hereby fully incorporate by reference for all intents and purposes.

At 536, the corrected cylinder trapped air amount and the corrected cylinder scavenging air amount may be input to a model to determine exhaust exotherm temperature. In one example, the exhaust exotherm is determined according to the method described in U.S. patent application Ser. No. 12/481,468 which is hereby fully incorporated by reference for all intents and purposes.

Thus, the controller of FIG. 5 provides for adjusting fuel injection amount and fuel injection timing based on oxygen sensor feedback. FIG. 5 also provides for correcting cylinder trapped air amount and cylinder scavenging air amount based the oxygen sensor output.

Referring now to FIG. 6, a high level flowchart of a method for correcting cylinder trapped air amount and cylinder scavenging air amount with an oxygen sensor is shown. The method of FIG. 6 may be executed via instructions of controller 12 in the system shown in FIG. 1.

At 602, method 600 determines engine operating conditions. Engine operating conditions may include but are not limited to engine speed, engine temperature, ambient temperature, MAP, cylinder air amount, exhaust gas oxygen concentration, valve timing, and engine torque requested. Method 600 proceeds 604 after engine operating conditions are determined.

At 604, method 600 computes corrected amount of fuel injected to an engine in response to oxygen sensor output. The oxygen sensor may be positioned in an exhaust system as shown in FIG. 1.

An amount of fuel injected to a cylinder may be comprised of two or more fuel injection amounts. In one example, the fuel injected to a cylinder may be expressed as:

$$\text{fuel\_cyl} = \text{fuel\_ol} + \text{fuel\_trim}$$

$$\text{fuel\_ol} = \phi_{dsd} *$$

$$\frac{\text{air\_chg\_tot}}{\text{AF\_stoic}} \left( \begin{array}{ll} \phi_{dsd} = 1 & \text{stoich exhaust} \\ \phi_{dsd} = \text{air\_chg}/\text{air\_chg\_tot} & \text{stoich in-cyl., lean exhaust} \end{array} \right)$$

$$\text{fuel\_trim} = \phi_{trim} * \frac{\text{air\_chg\_tot}}{\text{AF\_stoic}} (\phi_{trim} \text{ is the closed loop fuel-air-ratio trim})$$

where fuel_cyl is an estimate of the fuel delivered to a cylinder, fuel_ol is an open loop fuel amount, $\phi_{dsd}$ is a desired equivalence ratio for engine operation based on engine speed and cylinder trapped air amount, air_chg_tot is total amount of air flowing through a cylinder during a cylinder cycle, air_chg is a cylinder trapped air amount that participates in combustion within the cylinder, AF_stoic is a stoichiometric air-fuel ratio for the fuel being combusted in the engine, fuel_trim is a closed-loop fuel amount adjustment that is based on a fuel-air ratio trim that is determined via subtracting φ determined from output from an oxygen sensor from a desired φ as described in FIG. 5. It should be noted that the closed loop fuel system allows for trim to not respond to a square wave modulation imposed on fuel injection for catalyst efficiency. By denoting the actual total mass of air that passes by the intake valve in one event by $m_{tot}$, equivalence ratio as inferred from exhaust gas oxygen content can be described as:

$$\phi_{exh} = \frac{\text{fuel\_cyl} + \Delta\text{fuel}}{m_{tot}} * \text{AF\_stoic} = \frac{(\phi_{dsd} + \phi_{trim}) * \text{air\_chg\_tot}}{m_{tot}} + \frac{\Delta\text{fuel}}{m_{tot}} * \text{AF\_stoic}$$

where Δfuel is a left-over fuel mass due to inaccuracies in compensating for various other sources (e.g. incomplete transient fuel or purge flow compensation). In quasi steady state conditions, the closed loop fuel correction (fuel_trim) makes the exhaust fuel-to-air ratio $\phi_{exh} = \phi_{dsd}$. Solving for $\phi_{trim}$ yields:

$$\phi_{trim} = \phi_{dsd} \left( \frac{m_{tot}}{\text{air\_chg\_tot}} - 1 \right) - \frac{\Delta\text{fuel}}{\text{air\_chg\_tot}} * \text{AF\_stoic}$$

Thus, it may be observed that the closed loop correction $\phi_{trim}$ compensates for air_chg_tot not being equal to the actual total air mass ($m_{tot}$) and for various residual errors in fuel compensation. Method 600 proceeds to 606 after the injected fuel amount compensation is determined.

At 606, method 600 judges whether or not scavenging conditions are present. In one example, scavenging may be determined according to the logic described for block 522 of FIG. 5. If scavenging conditions are determined, method 600 proceeds to 608. Otherwise, method 600 proceeds to 614.

At 608, method 600 corrects a total amount of air flowing through a cylinder during a cylinder cycle. In one example, the total amount of air flowing through the cylinder is corrected according to the following instructions:

if (blow_through_region = TRUE)

$$\text{air\_phi\_ratio} = \frac{\phi_{trim}}{\phi_{dsd}} - \min\left\{ \max\left\{ \frac{\phi_{trim}}{\phi_{dsd}}, -q \right\}, q \right\}$$

air_phi_corr_tmp = min{max{air_phi_ratio, phi_ratio_max}, phi_ratio_min} else air_phi_corr_tmp = 0 end air_phi_corr = rolav(tc_corr_, air_phi_corr_tmp)

air_tot_corr = air_chg_tot * (1 + air_phi_corr)

where blow_through_region is a logic variable that indicates the presence or absence of scavenging conditions, where air_tot_corr is the corrected total air-charge (in-cylinder air+ scavenging air), where phi_ratio_max and phi_ratio_min are clips or limits for the air-fuel ratio corrections used in total cylinder air flow correction (e.g., +/−0.15), where min and max denotes an operation of taking the minimum or maximum of the respective variables in parentheses, where rolav is a first order low-pass having a time constant tc_corr set to about 2 to 3 times the UEGO closed loop response time constant. Method 600 proceeds to 610 after the total amount of air flowing through the cylinder is corrected.

At 610, the cylinder trapped air amount and the cylinder scavenging air amount are separately corrected based on the corrected total amount of air flowing through the cylinder. In one example, the cylinder trapped air amount and the cylinder scavenging air amount are determined according to the following equations:

$$\text{air\_chg\_corr} = \min\{\text{air\_tot\_corr}, \text{air\_}c^* (1-r\_\text{pb})^* \text{MAP}\}$$

$$\text{air\_bt\_corr} = \max\{0, \text{air\_tot\_corr} - \text{air\_}c^* (1-r\_\text{pb})^* \text{MAP}\}$$

where air_c is the volumetric efficiency for full cylinder volume and where r_pb is the push-back ratio. Method 600 proceeds to 612 after cylinder trapped air amount and cylinder scavenging air are corrected.

At 612, method adjusts inferred exhaust manifold pressure. In one example, method 600 adjusts inferred exhaust manifold pressure according to the following equations:

$$\text{exhmap\_slope}(k+1) = \min\{\text{slope1}, \max\{\text{slope2}, \text{exhmap\_slope}(k) - \epsilon\_\text{adapt}^*(\text{air\_tot\_corr}(k) - \text{air\_chg\_tot}(k))\}\}$$

where $\epsilon$_adapt is a (small) adaptive gain and slope1 and slope2 are correction limits that may be set at +/−1.6 based on the slope values shown in FIG. 4. The scavenging region entry condition described at 606 may be the basis for updating the exhaust pressure. The slope correction may be used as a basis to adjust the estimate of the exhaust manifold pressure:

$$\text{air\_exhmap\_corr} = \text{air\_exhmap} + \text{exhmap\_slope}^* \text{exh\_mass\_flow}$$

where exh_mass_flow may be estimated based on total air flow through the engine. In one example, flow through each engine cylinder may be added together to determine engine air flow and engine exhaust flow may be set equal to engine air flow. Method 600 proceeds to 614 after engine exhaust manifold pressure is corrected.

At 614, method 600 adjusts actuators in response to corrected cylinder trapped air amount, corrected cylinder scavenging air amount, and corrected exhaust pressure. Alternatively, when scavenging is not present, actuators are adjusted according to uncorrected cylinder trapped air amount. In one example, timing of spark delivered to an engine cylinder is determined via indexing a table or function of empirically determined spark values using engine speed and corrected cylinder trapped air amount. The table outputs spark advance timing based on the engine speed and corrected cylinder trapped air amount and spark is delivered to the cylinder at the timing output from the table.

In another example, cam phase is adjusted based on the corrected scavenging air amount. For example, if a scavenging air amount is greater than a desired scavenging air amount, a scavenging error is determined via subtracting corrected scavenging air amount from desired scavenging air amount. The phase of intake and/or exhaust cams is adjusted according to the scavenging error. In one example, when the scavenging error is negative, intake and exhaust valve overlap is reduced so that intake and exhaust valves of a cylinder are simultaneously open for a shorter period of time. In another example, intake and exhaust valve overlap is increased when the scavenging error is positive so that intake and exhaust valves of a cylinder are simultaneously open for a longer period of time.

PCV valve operation and EGR valve operation similar to the way spark timing is adjusted in response to corrected cylinder trapped air amount. For example, if corrected cylinder trapped air amount is increased to a lower value, flow from PCV and EGR valves may be reduced. Method 600 proceeds to exit after engine actuators are adjusted to corrected cylinder trapped air amount and corrected cylinder scavenging air amount.

Thus, the methods of FIGS. 5 and 6 provide for a method for operating an engine, comprising: adjusting a first actuator in response to an cylinder scavenging air amount, the cylinder scavenging air amount corrected via an oxygen sensor; and adjusting a second actuator in response to a cylinder trapped air amount, the cylinder trapped air amount corrected via the oxygen sensor apart from the cylinder scavenging air amount. In this way, cylinder trapped air amount and cylinder scavenging air amount may be separately adjusted base on a corrected total air amount flowing through a cylinder during a cycle of the cylinder.

The method also includes where the first actuator is a valve timing actuator and where the second actuator is an ignition coil providing spark to the engine. The method also includes where the first actuator and the second actuator are a same actuator. In another example, the method includes where the cylinder scavenging air amount and the cylinder trapped air amount are based on a total cylinder trapped air amount. The method further comprises determining presence of cylinder scavenging air in response to engine speed, MAP, and valve overlap. The method also includes where valve overlap is a duration when intake and exhaust valves of a cylinder are simultaneously open.

The methods of FIGS. 5 and 6 also provide for operating an engine, comprising: adjusting fuel injection timing in response to a corrected total cylinder trapped air amount flowing through a cylinder during a cycle of a cylinder; adjusting a cylinder trapped air amount based on the corrected total cylinder trapped air amount flowing through the cylinder; adjusting a cylinder scavenging air amount based on the corrected total cylinder trapped air amount flowing through the cylinder; and adjusting a first actuator in response to the cylinder trapped air amount. In some examples, the method further comprises estimating an exhaust parameter in response to the cylinder scavenging air amount. The method also includes where the exhaust parameter is an exhaust catalyst exotherm.

The method also includes where the first actuator is an ignition coil, and further comprising adjusting a second actuator in response to the cylinder scavenging air amount. The method further includes where the second actuator is a camshaft phase actuator. The method further comprises increasing intake valve and exhaust valve opening overlap to increase the cylinder scavenging air amount when the cylinder scavenging air amount is less than a desired cylinder scavenging air amount. The method also includes where the corrected total cylinder trapped air amount flowing through the cylinder is corrected via an output of an oxygen sensor.

As will be appreciated by one of ordinary skill in the art, the methods described in FIGS. 5 and 6 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. A method for operating an engine with aid of a controller, comprising:
   measuring oxygen using an oxygen sensor operatively connected to the controller;
   using the controller, separately correcting a cylinder scavenging air amount, and correcting a cylinder trapped air amount with the output of the oxygen sensor;
   adjusting a first actuator, operatively connected to the controller, based on the corrected cylinder scavenging air amount; and
   adjusting a second actuator, operatively connected to the controller, based on the corrected cylinder trapped air amount.

2. The method of claim 1, where the first actuator is a valve timing actuator and where the second actuator is an ignition coil providing spark to the engine.

3. The method of claim 1, where the first actuator is an electronically controlled throttle and the second actuator is an ignition coil providing spark to the engine.

4. The method of claim 1, where the cylinder scavenging air amount and the cylinder trapped air amount are based on a total cylinder air amount, and where the cylinder scavenging air amount is further corrected based on a push-back ratio.

5. The method of claim 1, further comprising adjusting an engine indicated torque based on the corrected cylinder trapped air amount via the controller.

6. The method of claim 1, further comprising determining presence of cylinder scavenging air based on engine speed, manifold absolute pressure, valve overlap, and turbocharger waste gate position using the controller.

7. The method of claim 6, where valve overlap is a duration when intake and exhaust valves of a cylinder are simultaneously open, and where the cylinder scavenging air amount and the cylinder trapped air amount are adjusted during an engine operating condition conducive for scavenging.

8. A method for operating an engine with aid of a controller, comprising:
   measuring oxygen using an oxygen sensor operatively connected to the controller;
   using the controller, correcting a total cylinder air amount flowing through a cylinder based on the output of the oxygen sensor, adjusting a cylinder trapped air amount based on the corrected total cylinder air amount flowing through the cylinder and adjusting a cylinder scavenged air amount based on the corrected total cylinder air amount flowing through the cylinder;
   adjusting fuel injection timing of a fuel injector operatively connected to the controller based on the corrected total cylinder air amount flowing through the cylinder during a cycle of the cylinder; and
   adjusting a first actuator, operatively connected to the controller based on the cylinder trapped air amount.

9. The method of claim 8, further comprising:
   using the controller adjusting an exhaust parameter based on the cylinder scavenged air amount, and separately adjusting the cylinder trapped air amount, and the cylinder scavenged air amount based on the output of the oxygen sensor.

10. The method of claim 9, where the exhaust parameter is an exhaust exotherm, and where the cylinder scavenged air amount is adjusted further in response to a push-back ratio via the controller.

11. The method of claim 8, where the first actuator is an ignition coil, and further comprising:
   adjusting a second actuator based on the cylinder scavenged air amount using the controller, the second actuator operatively coupled to the controller, and further comprising adapting exhaust pressure based on the corrected total cylinder air amount using the controller.

12. The method of claim 11, where the second actuator is a camshaft phase actuator.

13. The method of claim 12, further comprising increasing intake valve and exhaust valve opening overlap to increase the cylinder scavenged air amount when the cylinder scavenged air amount is less than a desired cylinder scavenged air amount.

14. An engine operating system, comprising:
   an engine;
   an actuator in communication with the engine;
   a turbocharger coupled to the engine;
   an exhaust system coupled to the turbocharger, the exhaust system including an oxygen sensor; and
   a controller including instructions stored in non-transitory memory for adjusting a total cylinder air amount based on an output of the oxygen sensor, the controller including instructions for providing a corrected cylinder trapped air amount and a corrected cylinder scavenging air amount based on the total cylinder air amount, the controller in operative communication with the actuator and controlling the actuator in accordance with the instructions.

15. The engine operating system of claim 14, further comprising instructions for adjusting spark timing of a cylinder based on the corrected cylinder trapped air amount.

16. The engine operating system of claim 14, further comprising instructions for adjusting valve timing based on the corrected cylinder scavenging air amount, and where the corrected cylinder scavenging air amount is adjusted based on a push-back ratio.

17. The engine operating system of claim 14, where the controller includes instructions to adjust the actuator based on the corrected cylinder scavenging air amount.

18. The engine operating system of claim 14, where the controller includes instructions to adjust the actuator in response to the corrected cylinder scavenging air amount.

19. The engine operating system of claim 14, further comprising instructions for adapting an exhaust pressure parameter based on a corrected total cylinder air amount.

* * * * *